April 7, 1942.　　　E. V. SWANSON　　　2,279,078
TRIMMING DEVICE
Filed July 23, 1940　　　2 Sheets-Sheet 1
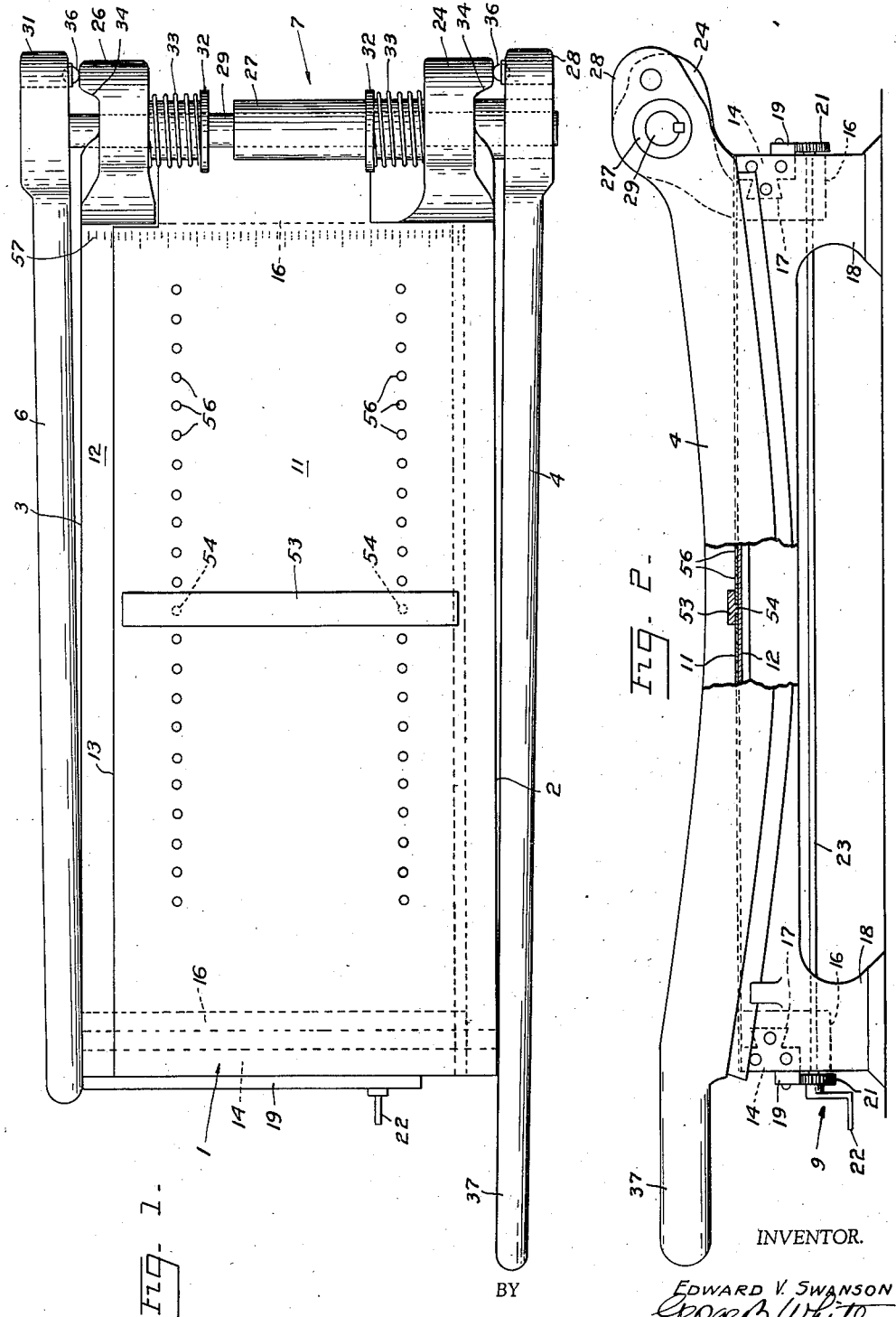
INVENTOR.
EDWARD V. SWANSON
BY George B. White
ATTORNEY.

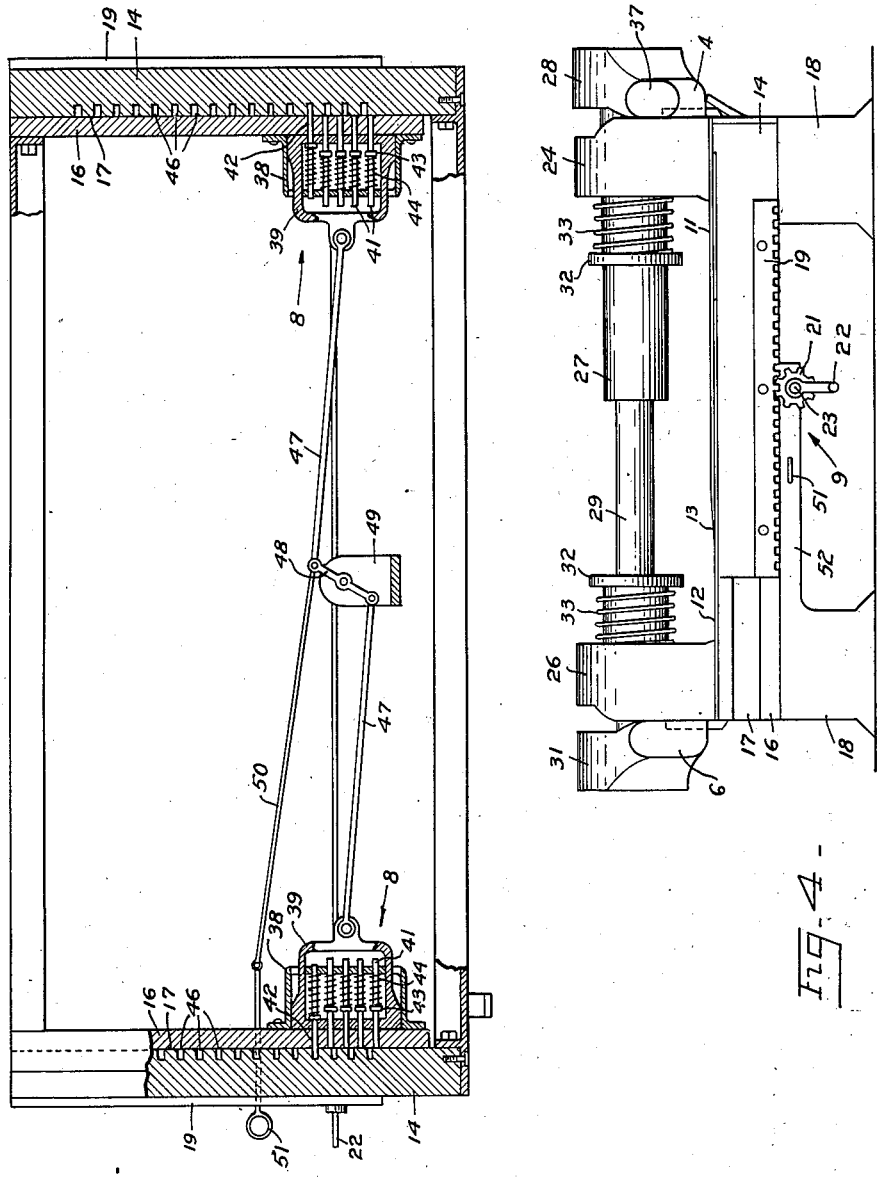

Patented Apr. 7, 1942

2,279,078

UNITED STATES PATENT OFFICE 2,279,078

TRIMMING DEVICE

Edward V. Swanson, San Francisco, Calif.

Application July 23, 1940, Serial No. 346,941

9 Claims. (Cl. 164—44)

This invention relates to a trimming board or cutter device.

The object of this invention is to provide a trimming board which can simultaneously trim two edges or ends of a sheet of material, such as paper or the like, and which can be adjusted to trim sheets to different selected sizes.

Another object of this invention is to provide a trimming board or paper cutter or the like, wherein the cutting edges of the board are adjustable to trim sheets of various dimensions, the cutters being adjustable for constant operative relation with the respective cutting edges in all positions.

Another object of this invention is to provide a trimming board in which a pair of cutters operate in unison adjacent spaced cutting edges of the board, and wherein means are provided to simultaneously set the relative spacing of the cutting edges and of the corresponding operative positions of the cutters.

A further object of this invention is to provide a trimming board which is adjustable to different widths, has a pair of spaced cutters acting in unison at spaced cutting edges, is releasably held in adjusted positions, and has adjustable means for aligning the sheets to be cut on the board.

Another object of this invention is to provide a trimming board which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a top plan view of the trimming board constructed in accordance with my invention.

Fig. 2 is a side view, partly in section, of the trimming board.

Fig. 3 is a sectional top view of the trimming board; and

Fig. 4 is an end view of the trimming board.

Heretofore the utility of the average trimming board was limited within comparatively small range of sizes. The trimming boards heretofore were made in sizes varying by about two inches, for instance, boards were made a square eight inch, ten inch, or twelve inch size, and so up to a size of the so-called cutting or trimming table, with large blades mounted on the table. In prior practice only one cutter was used at one edge of the board and the sheet to be trimmed had to be turned around for the trimming of each edge. To obviate the above and other disadvantages of the trimming boards and tables heretofore used, the herein invention provides a trimming board which is adjustable for handling sheets or trimmings of a variety of sizes and width in a considerably wide range, and which can be used to trim both edges of a sheet at the same time.

In carrying out my invention I make use of a table or board 1, having preferably parallel cutting edges or cutting guides 2 and 3. A pair of cutting tools such as blades 4 and 6 are respectively aligned with the cutting edges 2 and 3 so as to cut along said edges in the usual manner. A connection 7 between the mounted ends of the blades 4 and 6 is adapted to allow the changing of the spacing between the blades and connects the blades 4 and 6 for movement in unison. The cutting edges 2 and 3 are adjustably supported. A releasable catch mechanism 8 holds the cutting edges 2 and 3 in preadjusted positions. An adjustment mechanism 9 is adapted to adjust both cutting edges 2 and 3 and the blades 4 and 6 simultaneously to the desired spacing.

The cutting edges 2 and 3 may be separate strips adjustably attached to a fixed board or base, however, in the herein illustrative construction the board 1 itself is made of comparatively thin sections 11 and 12 arranged in superimposed and overlapping relation. The overlapping top edge 13 of the board section 11 is preferably mitered so as to smoothly fit over the underlying top surface of the other board section 12. In this illustrative embodiment the spacing between the cutting edges 2 and 3 is varied by moving the board sections 11 and 12 relatively to each other. The top board section 11 has below each end thereof, a suitable tongue such as a dovetail tongue 14 which is extended all along beneath the adjacent edge of the top board section 11, and faces inwardly of the board 1. The bottom board section 12 has at each end thereof a downwardly extended connection flange 16 with a dovetail groove 17 facing outwardly of the board for engagement by the tongue 14. The tongues 14 and the grooves 17 are located in alignment for slidable engagement. Thus the spacing between the cutting edges 2 and 3 and the width of the board 1 can be varied by sliding the board sections 11 and 12 relatively to each other. The tongue and groove connection between the board sections 11 and 12 maintains them in an operating plane.

The board 1 and the board sections 11 and 12 may be supported in a suitable manner. In the herein illustration, each board section 11 and 12 has at its outer corner a base or leg 18 on which the board 1 rests. In this form when the sections 11 and 12 are moved relatively to each other, the legs 18 of the respective sections move with said sections. To facilitate the adjustment of the width of the board 1, the adjustment mechanism 9 herein includes racks 19, which are connected to the outside of the tongues 14 of the section 11 and gears 21 journaled on the lower portion of the connection flanges 16 of the other section 12, so that the respective gears 21 engage the racks 19. A handle 22 at the front of the device is used to rotate a shaft 23 for rotating the gears 21, which latter in turn act on the racks 19 for relative sliding of the board sections 11 and 12.

The blades 4 and 6 are rotatably mounted on brackets 24 and 26 respectively, secured to the tops of the board sections 11 and 12 so that when the sections 11 and 12 are moved relatively to each other the brackets 24 and 26 move with them and carry the blades 4 and 6 in constant registry with the respective cutting edges 2 and 3. The connection 7 between the blades 4 and 6 includes a tubular shaft 27 fixed to the hub 28 of the blade 4. The shaft 27 is extended through the bearing bracket 24. A shaft 29 is extended from the hub 31 of the other blade 6 through the other bracket 26 and into the end of the tubular shaft 27. The shafts 29 and 27 are slidably splined or keyed together for unitary rotative movement. The inner shaft 29 is of such length as to remain engaged with the tubular shaft 27 throughout the entire range of adjustments of the board sections 11 and 12. Each shaft 27 and 29 has a fixed exterior collar 32 thereon located between the brackets 24 and 26 in spaced relation to the respective brackets. A coil spring 33 between each bracket 24 or 26 and the adjacent collar 32 yieldably pulls the respective shafts 27 and 29 and the blades 4 and 6 toward the cutting edges 2 and 3 respectively. In order that the blades 4 and 6 engage the article to be cut progressively from the bracket ends of the cutting edges 2 and 3, the positions of the hubs 28 and 31 are controlled by cams 34 provided on the outer faces of the brackets 24 and 26 respectively. A ball contact 36 in each hub 28 and 31 rides directly on the adjacent surface of the cam 34 so as to reduce friction. The springs 33 urge the blades 4 and 6 to follow the curvature of the cams 34. The cams 34 are so formed that the ball contacts 36 are in the depression of the cams 34 when the blades 4 and 6 are turned upwardly to inoperative position. The curvature of the cams 34 then gradually and circumferentially slants away from said lowest point so that the hubs 28 and 31 of the blades 4 and 6 are gradually pushed away from the planes of the cutting edges 2 and 3, while the other portions of the blades 4 and 6 are progressively brought into contact along the respective cutting edges. The blade 4 herein is provided with a handle or grip 37 for the manipulation of the blades, although it is optional to provide both blades 4 and 6 with such handles. The turning of either blade turns the other. The adjustment of the board sections 11 and 12 adjusts the positions of the blades 4 and 6 correspondingly and automatically.

The releasable catch mechanism 8 for holding the board sections 11 and 12 in adjusted positions, is located beneath the board 1. A frame 38 is secured to the inside face of each connection flange 16. In each frame 38 is slidably held a yoke 39. A plurality of pins 41 are slidable in aligned holes in the frame 38 and in the yoke 39. The pins 41 are movable toward and away from said dovetail groove 17 and the dovetail tongue 14 therein. Each pin 41 has a collar 43 thereon located between the yoke 39 and the frame 38. A coil spring 44 around each pin 41 bears at one end against the collar 43 and at its other end against the frame 38 so as to urge the pins 41 toward the tongue 14 in the groove 17. The holes 42 and the pins 41 are in rows longitudinal with respect to the connection flange 16 and are equally spaced from each other. A row of keeper holes 46 is provided longitudinally in the tongue 14 so that the rows of holes 42 and 46 are on the same level or line. The keeper holes 46 are also equally spaced from each other but the spacing between the keeper holes 46 is different from the spacing between the pins 41. For instance the difference between the spacings of the keeper holes 46 and pins 42 may be about 1/16 of an inch, which would result in the registering of one pin 42 with one keeper hole 46 every 1/16 of an inch apart. The row of keeper holes 46 extends along the length of the tongue 14 so that there can be engagement of a pin 41 at the innermost telescoped position of the board sections 11 and 12 as well as at the outermost extended position of said sections. The yokes 39 of the opposed units are connected by links 47 to the opposite ends of a substantially central horizontal lever 48 fulcrumed on a lug 49 depending from the underside of the lower board section 12. Another link 50 extends from one end of the lever 48 forwardly and has a handle 51 slidably held in a flange 52 below the front tongue 14 so as to be accessible from the front of the device for engaging and releasing the catch mechanism 8 at will. When the handle 51 is pulled forward of the board 1, then both yokes 39 are pulled away from the respective connection flanges 16. Each yoke 39 in turn engages the collars 43 so as to pull all the pins 41 out of the level of the tongue 14. This releases the particular pin 41 which was in engagement with one of the keeper holes 46. After the board sections 11 and 12 are adjusted the handle 51 is pushed in so as to return the yokes 39 to the wall of the connection flange 16. The yokes 39 thus free the pins 41 and whichever pin 41 is aligned with a keeper hole 46 is permitted to enter said keeper hole 46 under the urging of its spring 44.

It is to be noted that the board 1 in its collapsed position is elongated but its width is changeable so as to approximate or equal, or if necessary exceed, its length. In all its forms the herein board is compact, it is collapsible to a convenient narrow spacing, and it is easily changed to a wider board. The paper handled can be readily placed on the board and both edges trimmed at the same time. The cutting elements at the sides may be cutting rolls or blades, but are in alignment and adjustable with the cutting edges of the table. The cutting edges may be also adjustable relatively to a fixed support or table. In order to align the paper or sheet correctly for the trimming and to accommodate sheets of various sizes, an aligning strip or ruler 53 is placed on the top section 11 of the board 1. The ruler 53 is held in selected positions by a pair of prongs 54 which fit into corresponding pairs of holes 56 in the top section 11. The pairs of holes 56 for the prongs 54 are arranged in a series from the cutter supporting end to the front end of the board 1. The ruler 53 is easily removed and placed at a selected distance from the ends. All the pairs of holes 56 are aligned at a predetermined angle relatively to the cutting edges 2 and 3 so that when an edge of the sheet is rested against the ruler 53 then the other two sides of the sheet are properly aligned with the cutting edges 2 and 3 for the desired trimming.

In operation the sheet is placed on the board 1 and so aligned that its edges to be trimmed are positioned at the desired angle at the cutting edges 2 and 3. Then the blades 4 and 6 are turned down over the cutting edges and simultaneously cut and trim both edges of the sheet. If the sheet to be cut is wider, then the catch mechanism 8 is released and by operating the adjustment means 9, both board sections 2 and 3 are moved apart. After the desired width or spacing is reached the catch mechanism 8 is again engaged to hold said sections together as a unit.

It will be recognized that a particularly facile device is provided to accomplish the trimming of sheets of paper or the like; and one which combines light weight and adaptability for a variety of sizes and conditions, with a ruggedness of construction and positiveness of operation especially adapting it for its use. Being a unitary character, the device requires no careful setting up and lends itself to effective application by the labor ordinarily available, and by the average layman.

To further facilitate adjustment to a measured width, the lower plate 12 is provided with a transverse row of indicators forming a scale 57 on which the overlapping edge 13 of the top section 11 indicates the adjusted width of the table. This scale 57 may be pressed, engraved, painted, or otherwise formed on the surface of the bottom plate 12 in such a manner that it does not interfere with the relative sliding of the table sections.

I claim:

1. In a cutting device, a pair of relatively adjustable superimposed elements, a cutting edge on each of said elements, a cutting element connected to each element in constant operative relation to the respective cutting edge, and means to support said elements in slidable, superimposed relation so as to form a table surface of adjustable width.

2. In a trimming device of the character described, a cutting table having a pair of adjustable spaced cutting edges, a cutting element on the table in operative relation to each cutting edge, and connection for transmitting the operation of one cutting element to the other for simultaneous operation of the cutting elements at both cutting edges, said cutting element and the respective cutting edges being connected for simultaneous adjustments of the spacing of said cutting edges and of said transmitting connections, by rack and pinion, so as to maintain said cutting elements in constant operative positions relatively to the respective cutting edges.

3. In a device for paper trimming and the like, a table, a pair of superposed relatively slidable table surfaces forming said table, means to connect said surfaces together with freedom of adjustment for changing the width of the table, a cutting guide edge on each surface, and a cutting mechanism on each surface in operative relation to the adjacent cutting guide edge.

4. In a device of the character described the combination with relatively movable table sections forming a cutting table of variable width, of a plurality of spaced catch members, means to yieldably hold said catch members on one of said sections, a plurality of spaced retainers for said catch member on the other section arranged in a superimposed line opposite to said row of catch members, said catch members being equally spaced from each other, said retainers being equally spaced from each other, the spacing between said retainers being different from the spacing between said catch members so as to allow engagement of one catch member with one retainer in the various adjusted positions of said sections.

5. In a device of the character described, the combination with a table having a pair of spaced cutting guide edges and means to adjust the spacing between edges; of a pair of cutting blades, means to connect each blade to the table so as to be movable with the respective cutting guide edge, adjustable connection between the blades and at said first connecting means for transmitting the turning movement of one blade to the other.

6. In a trimming device of the character described, a pair of superimposed relatively slidable table sections, cutting edges on opposed free edges of said sections spaced apart from each other, cutting means on the slidable table sections operatively related to the respective cutting edges, and means to simultaneously adjust the table sections relatively to each other so as to adjust the spacing between said cutting edges and between said cutting means.

7. In a trimming device of the character described, a pair of superimposed telescoping table surfaces arranged to form a substantially level table surface of variable width, each table surface having a cutting edge thereon, a cutting element mounted on each table surface in operative relation to said cutting edge so that each cutting element is moved with the respective table surface when said table surfaces are adjusted so as to vary the spacing between the respective cutting edges.

8. In a trimming device of the character described, a pair of superimposed telescoping table surfaces arranged to form a substantially level table surface of variable width, each table surface having a cutting edge thereon, a cutting element mounted on each table surface in operative relation to said cutting edge so that each cutting element is moved with the respective table surface when said table surfaces are adjusted so as to vary the spacing between the respective cutting edges, and telescoping connection between the mounted ends of said cutting elements to transmit the motion of one cutting element to the other in all adjusted positions.

9. In a trimming device of the character described, a pair of superimposed telescoping table surfaces arranged to form a substantially level and continuous table surface of variable width, each table surface having a cutting edge thereon, a cutting element mounted on each table surface in operative relation to said cutting edge so that each cutting element is moved with the respective table surface when said table surfaces are adjusted so as to vary the spacing between the respective cutting edges, and telescoping connection between the mounted ends of said cutting elements to transmit the motion of one cutting element to the other in all adjusted positions.

EDWARD V. SWANSON.